Oct. 10, 1944.　　　　R. A. WOODSON　　　　2,360,298
OPTICAL SYSTEM
Filed Jan. 4, 1944
FIG. 1.
FIG. 2.
FIG. 3.
FIG. 4.
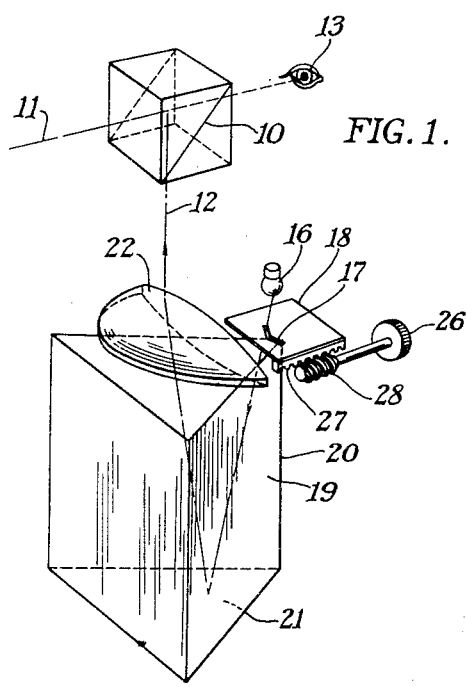
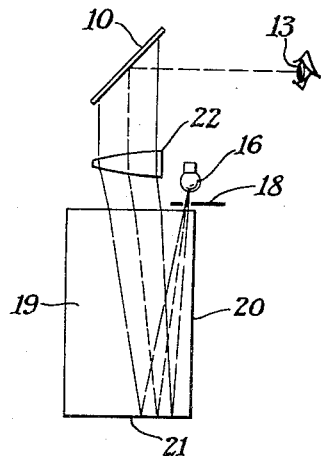
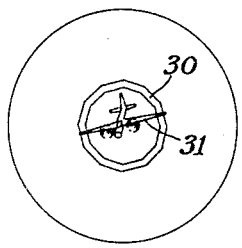
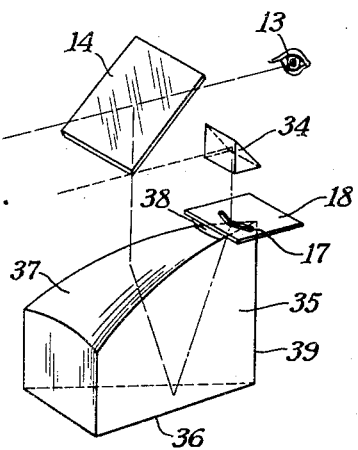
ROBERT A. WOODSON
INVENTOR
BY
ATTY & AG'T Patented Oct. 10, 1944

2,360,298

UNITED STATES PATENT OFFICE 2,360,298

OPTICAL SYSTEM

Robert A. Woodson, Rochester, N. Y., assignor to Eastman Kodak Company, Rochester, N. Y., a corporation of New Jersey Application January 4, 1944, Serial No. 516,923

6 Claims. (Cl. 88—2.3)

This invention relates to kaleidoscopic optical systems particularly to such systems used for producing a reticle for aiming or stadiametric ranging as described in patent application Serial No. 489,644, Altman, filed June 4, 1943.

The object of the present invention is to provide a compact but efficient kaleidoscope optical system. Particularly it is the object of the invention to provide such a system for producing a circle or approximate circle either of constant diameter for aiming or of variable diameter for stadiametric range finding.

According to the invention a kaleidoscope is made up with the usual pair of dihedral reflecting surfaces forming a roof edge and having a dihedral angle which is a sub-multiple of 360° and which is less than 180°. The angle is customarily equal to 60°. The operation of a kaleidoscope is well-known whereby any illuminated object, herein referred to as a "patrix" is seen together with repeated virtual images thereof forming a pattern which is concentric with the roof edge. If the dihedral angle is an even sub-multiple of 360°, the pattern is an even sided figure symmetrical about the roof edge, but if the angle is an odd sub-multiple of 360°, the pattern has an odd number of sides. The present invention is characterized by an arrangement which permits the use of dihedral reflectors of only half the normal length without distorting or cutting off any part of the pattern. This is accomplished by a third reflecting surface located orthogonal to the roof edge at the end thereof which is opposite to the patrix. Thus light from the patrix and from the pattern as a whole, travels down with the usual reflections between the dihedral reflectors and is reflected back from the third reflector, continuing to suffer the pattern forming reflections at the dihedral reflecting surfaces. The beam of light ultimately emerges to one side of the original patrix. It will be noted that this results in the effective length of the roof edge being twice its actual length.

When this kaleidoscopic system is to be used in an infinity sight for aiming a gun or in a stadiametric range finder, it is desirable to deviate the emergent beam so that the axis of the beam is parallel to the roof edge. The purpose of this is described in detail in the above mentioned Altman application. In the present invention it is accomplished by locating decentered lenses or other light deviating means adjacent to the patrix itself so that the patrix and the light deviating means share the end area of the dihedral reflecting system. When the present invention is used in a stadiametric range finder of the type in which the diameter of the comparison pattern is varied by adjusting the distance of the patrix from the roof edge, it will be noted that the range of motion of the patrix must be restricted to an area near the roof edge so as to leave, next to the patrix, an exit pupil for the emergent beam. In practice this restriction does not constitute a serious limitation on the use of the invention, however, since for most purposes only a very limited range of patrix movement is required.

Preferably the dihedral reflecting surfaces are two sides of a triangular prism, one edge of which acts as the roof edge and the third reflecting surface is coated on one end of the prism. That is, the sides of the prism reflect light by total internal reflection, whereas the end must be silvered or otherwise provided with a high reflecting surface in order to operate efficiently. The other end of the prism constitutes the exit pupil of the system and also adjacent to this exit pupil the area over which the patrix moves or at least is located. In one preferred embodiment of the invention this patrix and exit pupil end of the prism is shaped so that adjacent to the roof edge it includes a flat portion, orthogonal to the roof edge, through which a light beam from the patrix is admitted. Adjacent to this flat portion and including most of the end of the prism the surface is sloped (and preferably curved convexly) to act as the light deviating means to direct the axis of the emergent beam approximately parallel to the roof edge of the system. When the sloped area is convex, it also acts to focus the light and in the particular case wherein it is optically at its focal length from the patrix, it collimates the emergent beam.

The operation of the invention will be understood from the following description when read in connection with the accompanying drawing in which:

Fig. 1 is a perspective view of one embodiment of the invention.

Fig. 2 is a side elevation of the embodiment shown in Fig. 1.

Fig. 3 shows the field of view seen through the instruments shown in Figs. 1 and 2.

Fig. 4 is a perspective view of another embodiment of the invention.

The arrangement shown in Figs. 1 and 2 is a simplified stadiametric range finder which may be used as shown or built into a sighting device as described in the Altman application mentioned above. A semi-transparent mirror 10 receives and combines a target light beam 11 and a reticle light beam 12 sending them superimposed to the eye 13 of an observer. A lamp 16 illuminates a patrix in the form of a geniculate slit 17 in an adjustable mask 18. Light from this patrix X enters a prism 19 two sides of which act as a kaleidoscope forming a pattern concentric about a roof edge 20 of the prism. Since the patrix consists of a single geniculate line bent at an angle about 180° minus ½ of the dihedral angle at the roof edge 20, the resulting pattern is approximately circular as shown at 30 in Fig. 3. The light beam from the pattern passes through the prism 19 as shown and, according to the invention is reflected at the silvered end 21 of the prism. The kaleidoscopic action of the sides of the prism continues with respect to the returning beam so that the effective length of the roof edge 20 is twice its actual length. This requires the surface 21 to be orthogonal to the roof edge 20.

The beam emerging from the prism is adjacent to the patrix and the exit pupil of the prism is restricted to the area of the end face less whatever is occupied by the patrix. In general however, only a portion of the exit pupil is actually used. In the arrangement shown a portion 22 of a positive lens whose optic axis substantially coincides with the roof edge 20 receives the emergent beam, collimates it and directs the axis of the emergent beam parallel to the roof edge 20 as shown by the ray 12. That is, rays from the center of the pattern i. e. from the end of the roof edge 20 after passing twice through the prism 19 and being collimated by the lens 22 are parallel to the roof edge 20. This is perhaps best seen in Fig. 2.

The resulting pattern 30 is made of variable diameter, the range being given by a suitable scale, not shown, when the diameter is adjusted to match that of the target image 31. The actual diameter of the target must of course be recognized as with all stadiametric range finders. To provide this diameter adjustment the mask 18 is movable transversely (and the patrix itself radially) with respect to the roof edge 20, the movement being provided by a rack 27 driven by a worm 28 which in turn is rotated by a knob 26.

In Fig. 4 a semi-transparent mirror 14 again combines a target and a reticle beam sending both to the eye 13 of an observer. In this case however the patrix 17 is illuminated by daylight reflected onto the patrix by prism 34. Light from this patrix enters a kaleidoscopic prism 35 through a flat area 38 on one end of the prism 35 which area is orthogonal to the roof edge 39 of the prism. The other end 36 of the prism 35 is silvered or otherwise made reflecting to reflect this beam back toward the patrix end but to one side of the patrix. This returning beam strikes a sloped, specifically a convex, area 37 of the patrix end of the prism and is directed parallel to the roof edge 39. The area 37 is convex and optically at its own focal length from the patrix 17 so that it not only deviates the beam but also collimates it. This results in a very compact arrangement for two reasons, first, the actual length of the roof edge is reduced to half that normally required and second, the patrix, the means of illuminating the patrix and any adjusting means are all located at the same end of the prism as is the optical system which operates on the emergent beam. The highly efficient feature of the invention is the fact that the patrix operates over a portion of the end of the prism which is not normally used otherwise. That is, the maximum exit pupil of a kaleidoscopic optical system normally employed is a more or less circular area osculating the dihedral reflectors and thus the area immediately adjacent to the roof edge at the exit end of the system is neglected in all previous systems. The present invention makes use of this area for the patrix itself.

What I claim and desire to secure by Letters Patent of the United States is:

1. A kaleidoscopic optical system comprising a pair of dihedral reflecting surfaces forming a roof edge and having a dihedral angle which is a submultiple of 360° and which is less than 180°, a patrix near one end of the roof edge whereby the reflecting surfaces form a pattern from the patrix in kaleidoscopic fashion concentric with the roof edge, means for illuminating the patrix and a third reflecting surface orthogonal to the roof edge at the other end thereof for reflecting light from the patrix back past the patrix whereby the effective length of the roof edge is double its actual length.

2. A system according to claim 1 in which a lens is located adjacent to, and farther from the roof edge than, the patrix to receive a beam of the reflected light and to deviate it so that the axis of the beam is approximately parallel to the roof edge.

3. A system according to claim 1 in which the patrix appears as a line of light, the pattern is a closed figure, and means are provided for varying the distance of the patrix from the roof edge for varying the diameter of the pattern, the range of variation of the patrix being restricted to an area near the roof edge so as to leave next to the patrix an exit pupil for the reflected light between the ends of the pair of reflecting surfaces.

4. A system according to claim 1 in which the pair of dihedral reflecting surfaces are two sides of a prism, the third reflecting surface is coated on one end of the prism, the patrix is over one portion of the other end and the exit pupil of the system is another portion of said other end.

5. A kaleidoscopic optical system comprising a prism, two sides of which act as dihedral reflecting surfaces, intersecting in a roof edge and one end of which is orthogonal to the roof edge and is made reflecting, a patrix near the roof edge at the other end, said sides kaleidoscopically forming a pattern from said patrix, means for illuminating the patrix and for sending a light beam therefrom through the prism to the reflecting end and back through a portion of said other end of the prism farther from the roof edge than is the patrix, and light deviating means in line with the reflected beam to deviate its axis approximately parallel to the roof edge.

6. A system according to claim 5 in which said other end of the prism includes a flat portion orthogonal and adjacent to the roof edge through which the light beam from the patrix is admitted and another portion sloped to act as said light deviating means.

ROBERT A. WOODSON.